United States Patent [19]

Boutier et al.

[11] Patent Number: 4,764,196
[45] Date of Patent: Aug. 16, 1988

[54] CURVING OF GLASS SHEETS

[75] Inventors: Philippe Boutier, Thourotte; Luc Vanaschen, Eupen Belgique, both of France

[73] Assignee: Saint-Gobain Vitrage, Paris, France

[21] Appl. No.: 74,227

[22] Filed: Jul. 16, 1987

[30] Foreign Application Priority Data

Jul. 16, 1986 [FR] France ................................ 86 10330

[51] Int. Cl.⁴ .......................................... C03B 23/023
[52] U.S. Cl. ........................................ 65/106; 65/104; 65/107; 65/273; 65/287
[58] Field of Search .................. 65/104, 106, 107, 273, 65/287

[56] References Cited

U.S. PATENT DOCUMENTS 3,778,244 12/1973 Nedelec et al. ........................ 65/106
4,204,854 5/1980 McMaster et al. .................... 65/106
4,386,952 6/1983 Nitschke ............................ 65/287 X
4,514,208 4/1985 Nitschke ............................ 65/273
4,682,997 7/1987 Halberschmidt et al. ........ 65/273 X Primary Examiner—Arthur Kellogg
Attorney, Agent, or Firm—Oblon, Fisher, Spivak, McClelland & Maier

[57] ABSTRACT

Curving of glass sheets by application of said sheets against an upper curving form and possibly subsequently, after the deposit of said sheets onto a lower curving form, by depressing in accordance with said upper form is improved. After the taking up of a sheet of glass by the upper form, a current of hot gas is blown under the glass sheets in order to produce a pneumatic pressing. The process and opportunities enables the manufacture of curved glasses in accordance with complicated shapes and/or with an accentuated curvature but, nevertheless, with a surface free from defects.

13 Claims, 3 Drawing Sheets

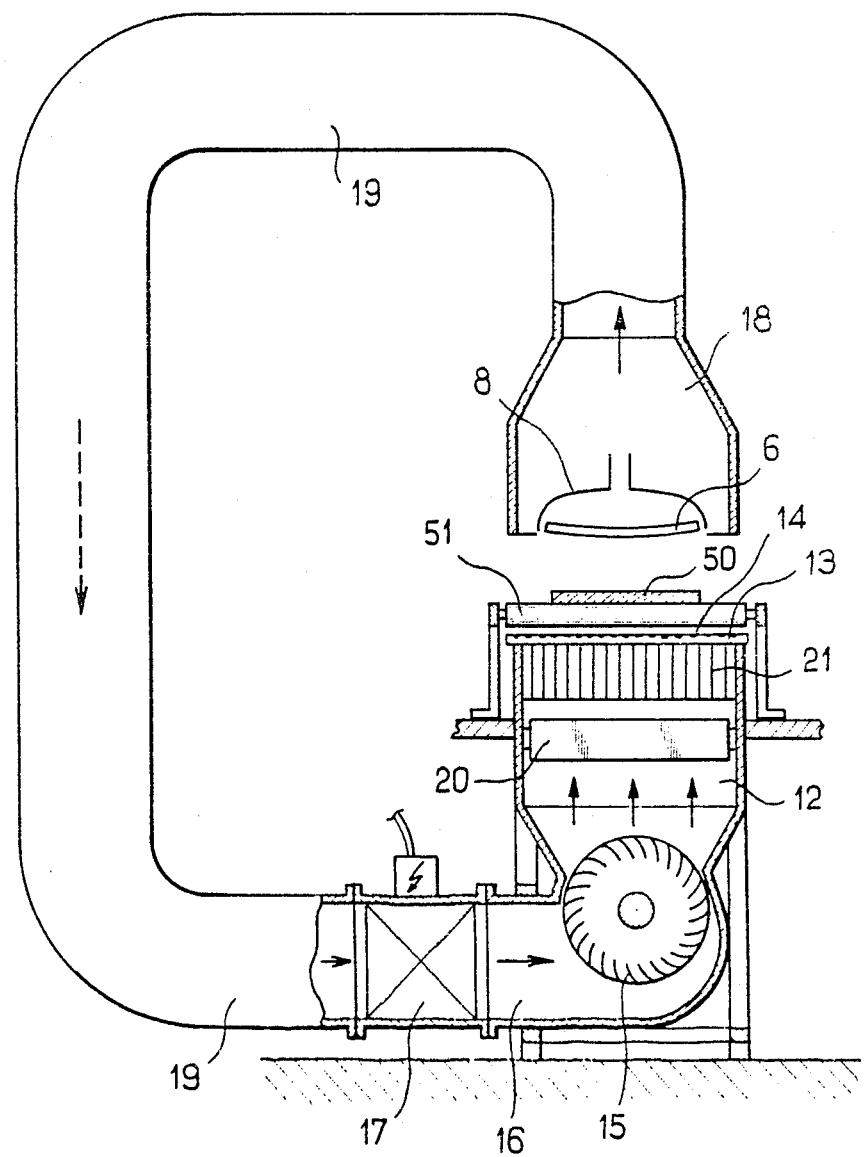
FIG_3

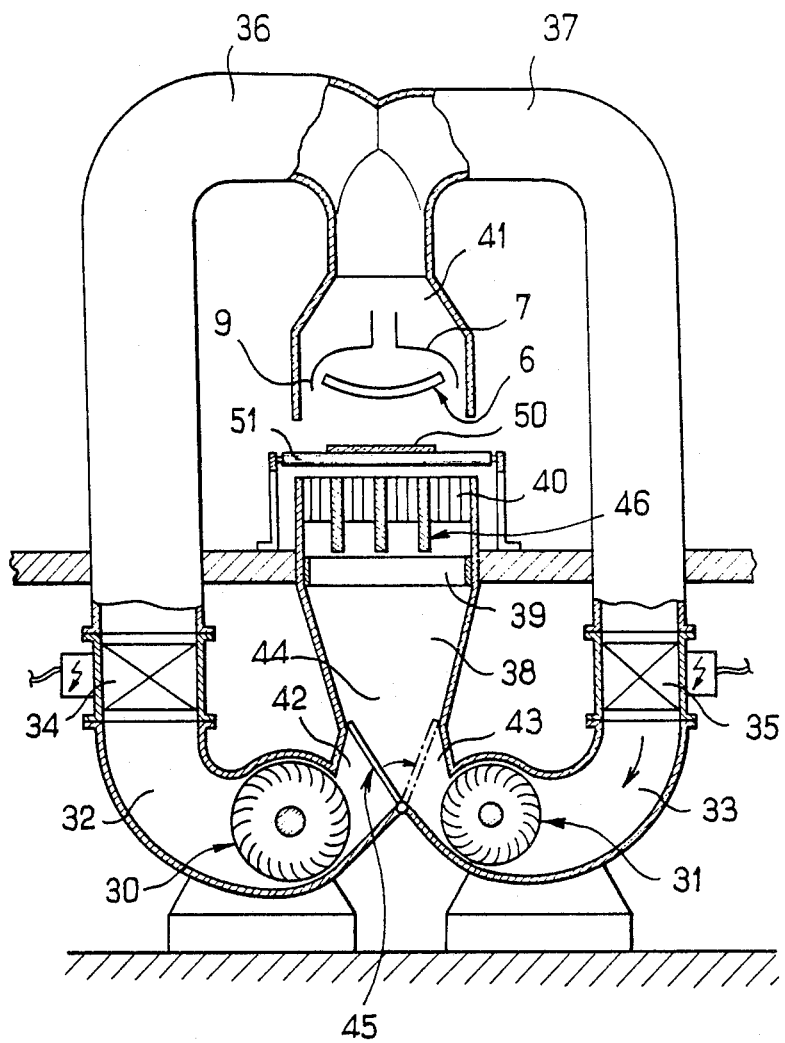
FIG_4

CURVING OF GLASS SHEETS

BACKGROUND OF THE INVENTION

1. Field of the Invention

The invention relates to the curving of glass sheets available on a horizontal or approximately horizontal support, for example, a conveyer, said curving being carried out by application of the sheets, brought to their softening temperature, against an upper form, then possibly through deposit of said sheets under the effect of gravity onto a lower form and after their deposit onto said lower form, said lower form being generally composed of a ring with an open curved profile at its center, further called a curving frame or skeleton.

2. Discussion of Background

It is known from European patent No. 5 306 to pass sheets of glass from their horizaontal or approximately horizontal support, for example their conveyer, to the upper form, using a current of gas under pressure blown under the sheets of glass, vertically from below upwards. This ascending gas current applies the sheets of glass against the upper form with a certain violence resulting in certain detrimental marks on the surface of the glass.

In effect, since the upper form is curved and the sheets of glass are initially flat, the first contact takes place on only a reduced portion of the surface, at the center in the large majority of cases, that is, those cases where the upper form is convex, and the marks are all the greater when the contact is more violent and when the contact surface is reduced.

It is further known from French patent document published under the No. 2 085 464 and from French patent application No. 8604962 to apply sheets of glass against the upper form using suction exerted at the periphery of the curving form, with said curving form being associated with a suction box. This method of applying sheets of glass overcomes the disadvantage of marking at the center of the sheets of glass. In effect, the walls of the suction box which surround the curving form by providing a space between said walls and said curving form in order to allow the suction, assist in the confinement of the air suction to the edges of the sheets of glass. The result is that the glass comes gently up against the upper curving form and hence results in better surface quality of the glass curved in this manner.

This technique is satisfactory for manufacturing glasses with conventional curvatures. However, for large curvatures of the upper form which lead to strongly curved glasses, it can be noted that, after the sheets of glass come against the curving form, there is a less tight application of said sheets against the curving form in certain areas, particularly at the center, which can go as far as detachment from these areas and in particular from said center of the sheets with regard to the curving form.

SUMMARY OF THE INVENTION

The present invention seeks to overcome the disadvantages of both techniques with a view to obtaining a better quality of the curved glass and with a view also to providing manufacture of curved glasses with complex and/or deep shapes with total control of the curving at each area of the glass.

For this, the invention proposes a method for curving glass in which the sheets of glass available in a horizontal or approximately horizontal position on a support such as a conveyer are applied against an upper curving form arranged thereabove, then possibly deposited on a lower curving form of the curved profile frame type, which is open at the center, on which they are depressed under the effect of gravity. In this method the upper curving form is associated with a suction box whose lateral walls surround said form by providing a space between then and the form in order to enable the suction to be exerted, and in this method after the sheet of glass has been taken up by the upper form, an ascending current of gas, which is intended to improve the application of certain areas of the sheet of glass against the upper form, is blown under said glass sheet.

This ascending blowing is preferably a differentiable blowing, in accordance with the different areas of the glass sheets, that is that the blowing pressure is independently adjustable in the different areas, so as to adapt the effect to each area.

By way of example, the differentiation can take place between the center and the periphery of the glass sheets.

The blowing pressures can vary from a zero or low value on the order of 5 mm of water column (CE) to greater values which can reach 50 to 60 mm CE and even 80 to 100 mm CE.

Preferably, when the sheets of glass are then deposited on a lower curving form composed of a ring or frame which is open at the center, the blowing pressure is still exerted but at a reduced value on the order of 5 to 30 mm CE, and preferably on the order of 5 to 15 mm CE, at the moment of depositing the sheets of glass on the lower form, and/or then during the period of depression of the glass on the lower curving form.

The invention also proposes a device for using said method.

BRIEF DESCRIPTION OF THE DRAWINGS

The invention will now be described in more detail by reference to the attached drawings which represent:

FIG. 3: a diagram of the installation for using the method of the invention.

FIG. 4: a diagram of a preferred embodiment of the installation for this invention.

DETAILED DESCRIPTION OF THE PREFERRED EMBODIMENTS

Figure 1:
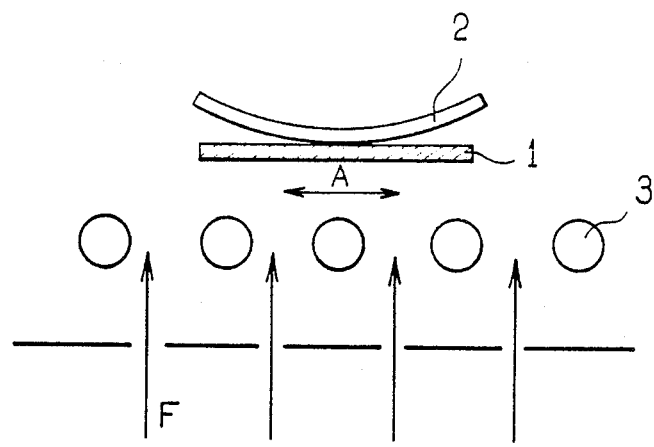
FIG. 1: an illustration of the defect noted at the center of glass sheets applied against the upper form by an ascending gas current.

FIG. 1 illustrates the defect noted by applying the technique described in European patent No. 5 306, that is by bringing a sheet of glass 1 in contact with an upper curving form 2 using an ascending gas current being exerted under the sheet of glass 1. The gas current is shown by arrows F arranged between the rollers 3 which initially carried the glass before its removal. The area of glass sheet 1 on which the surface defects are shown is the central area A.

Figure 2:
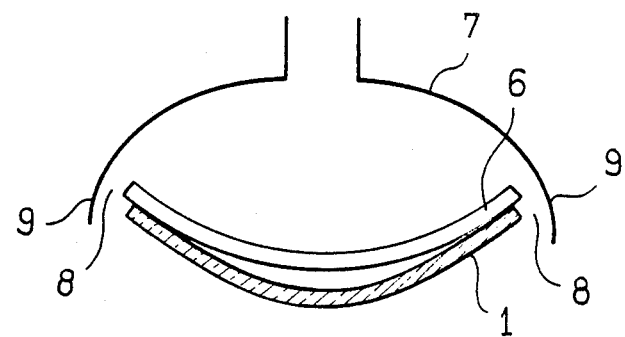
FIG. 2: an illustration of the tendency of detaching at the center of the sheets of glass when the application against the curving form results from suction at the periphery of the curving form.

FIG. 2 illustrates the other disadvantage which may be noted when the other already mentioned technique is applied, that is, the one wherein an upper curving form 6 is associated with a suction box 7 and wherein the sheet of glass 1 is brought into contact with said upper form 6 by the suction which is exerted at the periphery of said form 6, in the space 8 provided between the lateral walls 9 of the suction box 7 and the curving form 6.

This technique combines the suction to the edges of the sheets of glass 1 and therefore a certain autoregulation of the suction which prevents the defects noted with the preceding technique, but, in particular if the curving form 6 has a pronounced convex shape, on the contrary risks detachment of the sheets of glass 1 from the form 6, in certain areas and in particular in the center.

The invention essentially consists, when using the technique illustrated by FIG. 2, of providing an additional support to the glass already plated against the upper form, in the regions where it would have a tendency to become deformed in an undesirable manner, in particular to become detached from the upper form and especially at its center.

A vertical ascending blowing of hot gas is therefore provided beneath the sheet of glass. This current of hot gas is provided by a chamber 12 of gas under pressure whose upper wall 13 located under the rollers 3 is provided with a plurality of exits 14 from where the jets of gas are released. This chamber is part of a blowing assembly essentially comprising a ventilator 15, a supply pipe 16 for the ventilator 15, electric heating means 17 arranged at the top of the supply pipe 16 to heat the gas current to the necessary temperature of approximately 650° C. for glass, a hood for recovery of the blown hot gas which is arranged above the upper curving form 6, a recycling duct 19 connecting the hood 18 to the supply pipe 16, movable paddles 20 by means of which the flow rate of the blown gas can be modified, and vertical deflectors 21 which serve to regulate the discharge of the gas.

By adjustment of the system of ventilators 15 and/or by playing on the position of the paddles 20, the speed of discharge of the hot gas, in particular air, can be adjusted so as to have the desired pressure under the sheets of glass in the desired areas of their surface.

In view of the frequent operations at alternatively high pressures, which can reach and even exceed 50 and 60 mm CE, and low pressures around 5 to 15 mm CE, it is preferable to use the blowing installation shown in FIG. 4 in which a double blowing circuit is provided to act under the sheets of glass, with the activation of one in place of the other being obtained by simple pivoting of a paddle.

In accordance with the embodiment illustrated in FIG. 4, there is provided two ventilators 30 and 31, for example with transversal flux, with different power levels provided, with each having its own supply pipe 32, 33, its own air heating means 34, 35, and its own recycling circuit 36, 37. However, there is only one chamber 38 under pressure with its paddles 39 and its deflectors 40 and a single suction hood 41 above the curving station.

The respective outputs 42 and 43 for each ventilator 30, 31 exit into a common discharge pipe 44 which terminates in the chamber 38 and a pivoting paddle 45 brings the exit of one or the other of the two ventilators 30, 31 in communication with said common pipe 44. The exit from the common hood 41 is subdivided into each of the two recycling circuits 36 and 37. Therefore each of the two ventilators turns at its own speed and is capable of delivering a gas current corresponding to said speed, with the pivoting of paddle 45 enabling the selection of the desired gas current, either the weaker one or the stronger one, which is appropriate for the step of the method.

In addition, power modulations of the gas current around the base power can be obtained by activating the paddles 39 and the deflectors 40.

Further in addition, vertical walls 46 inside chamber 38 enable the gass current provided to be subdivided into a plurality of adjacent currents whose powers are regulated separately by action on the paddles 39 located inside each subdivision.

In this manner, a gas current with an adjustable determined power can be selected to be assigned to a given area of the sheets of glass.

The system operates in the following manner: a sheet of glass 50 arrives on the roller conveyer 51 arranged under the upper curving form 6 shown in FIG. 2. Since a suction is applied in the suction box 7 associated with said form 6 and the assembly of form 6 and box 7 descend, the sheet of glass 40 is taken up by said form 6.

Due to the suction at the periphery, the extension of the lateral walls of box 7 on the sides of form 6 and/or due to deflectors, which are not shown, which like the extensions of the lateral walls 9 channel the ventilation, the sheet of glass comes gently up against the upper curving form 6.

Then, in order to avoid an undesired deformation of said sheet of glass, due to detachments in certain areas, in particular at the center, the ascending vertical blowing is activated under the glass sheet, either under the totality of the surface of said sheet, at a single pressure or with different pressures depending on the areas, or solely depending on limited areas of the surface by using the possibility which is offered of subdividing the gas current and modulating its power. In this phase of the method, it is generally a realtively high blowing power which is necessary, that is on the order of 50 to 60 mm CE. Consequently, the speed of the single ventilator 15 is adapted or, where two ventilators 30, 31 are available, the paddle 45 is pivoted in order to utilize the gas current provided by the most powerful ventilator.

In this manner a veritable pneumatic pressing takes place with pressing pressures capable of being varied depending on the areas of the sheets of glass.

This pressing with the lower gas current can be combined with suction through the upper form in certain regions as is provided by the aready cited French patent No. 2 085 464.

Then, since the curving or the precurving against the upper form has been carried out, the sheet of glass 50 is deposited onto a removal carriage which is possibly provided with a lower curving form, such as a frame with a curved profile which is open at the center. During the descent of the glass sheet, an ascending gas current can again be blown, generally with a lower power on the order of 5 to 30 mm CE and preferably on the order of 5 to 15 mm CE. In this case, when the possibility is so offered, paddle 45 is pivoted placing the weaker ventilator in communication with chamber 38. Where there is only one ventilator 15, its rotation speed is adjusted.

Due to this blowing, the descent of the glass is softened detrimental rebounding of the sheet of glass on the upper form or on the removal carriage is prevented, and the sliding of the sheet of glass along possible positioning guides associated with said lower form or said carriage is facilitated.

The result is an absence of defects on the glass and better positioning of the sheets of glass. Insofar as the curving continues on the lower frame-shaped form, a lower blowing can further be continued to control the depression of the glass in the areas which are not held by the frame. Here again, the blowing can be modulated in power and/or differentiated depending on the areas. It can even be suppressed in certain areas.

Of course, all the above mentioned blowings can be practiced during a single curving operation or, to the contrary, only certain of them can be used.

The sheet of glass is then moved towards the next work station, for example a tempering station or a reheating station.

Of course, the curving as described can be carried out on a sheet of glass composed of a single sheet of glass or of a stack of sheets of glass or other material.

The invention provides sheets of curved glass which are free of defects and which can have multiple and/or accentuated complex curves.

We have indicated that the blowing pressures can be differentiated depending on the areas of the sheets of glass, for example between the center and the periphery but of course differentiations depending on other areas are possible.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for bending a sheet of glass, comprising advancing a sheet of glass brought to its softening temperature available in a horizontal or approximately horizontal position on a support, to lie beneath an upper convex curving form surrounded by a suction box whose lateral walls surround said upper form by providing a space between them and the upper form in order to enable suction to be exerted at the periphery of the glass sheet when it is in contact with the upper form, applying suction to said glass sheet by way of the suction box to cuase said glass sheet to be taken up by and contact said upper form while experiencing a suction exerted at the periphery of said glass sheet, and,
   after the sheet of glass has been taken up by the upper form, applying pressure upon selected areas of the sheet of glass by initiating the flow of a vertical ascending current of heated gas, directed upon said glass sheet under the glass sheet,
   to improve the application against the upper form of areas of the sheet of glass which are susceptible to detachment from the upper form.

2. The method in accordance with claim 1, wherein the blowing pressure of said gas current is differentiable in power depending on the areas of the sheet of glass, such that a different blowing pressure is applied between the center and the periphery of said sheet of glass.

3. The method in accordance with claim 1, wherein the gas current blowing pressure varies between about 5 mm CE and about 100 mm CE.

4. The method in accordance with claim 1, wherein the blowing is continued when the sheet of glass is released by the upper curving form and deposited on a lower component for further processing.

5. The method in accordance with claim 4, wherein the blowing pressures practiced during the placing of the glass on a lower component are on the order of 5 to 30 mm CE.

6. The method of claim 5, wherein said pressures are on the order of 5–15 mm CE.

7. The method in accordance with claim 5, wherein said lower component comprises a curving frame, with the pressures being on the order of 5 to 30 mm CE while the glass is deposited on said curving frame.

8. The method in accordance with claim 7, wherein the continued blowing is exerted at the center of the sheet of glass which is not supported by the frame.

9. The method of claim 1, wherein said glass sheet is subsequently deposited on a lower curving form.

10. A device for bending a glass sheet comprising in a curving station provided with a upper convex curving form associated with a suction box whose lateral walls surround said curving form are at a certain distance so as to provide a space to allow formation of suction intended to apply the sheet of glass against the upper curving form and hold it there, a chamber for hot gas under pressure capable of blowing said gas vertically under the sheet of glass after it has been taken up and applied against the upper curving form, said chamber containing within it paddles and vertical deflectors serving as means for differentiating the blowing and regualting the discharge of the gas for impinging upon different selected areas of the sheet of glass.

11. The device in accordance with claim 10, wherein the chamber of gas under pressure is part of a blowing assembly comprising at least one ventilator, means for reheating the blown gas, a recovery hood, a recycling circuit, adjustment paddles and delfectors.

12. The device in accordance with claim 10, further comprising means for varying the pressure of said blow gas.

13. The method in accordance with claim 1, wherein the blowing pressure of said gas current is differentiable in power depending on the areas of the sheets of glass requiring such differentiated pressure, such that larger blowing pressure is applied at areas most susceptible to detachment from the upper form.

* * * * *